UNITED STATES PATENT OFFICE.

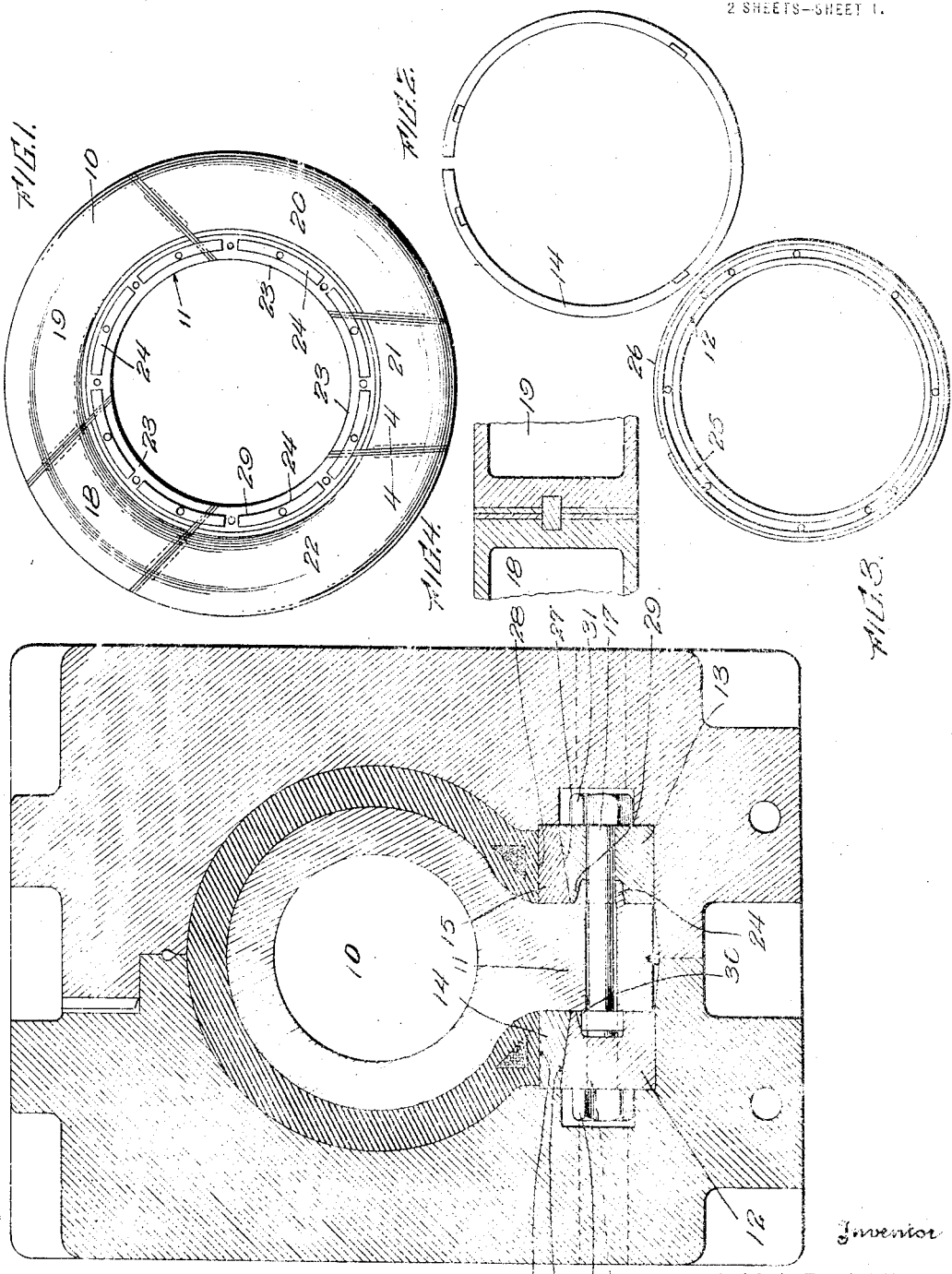

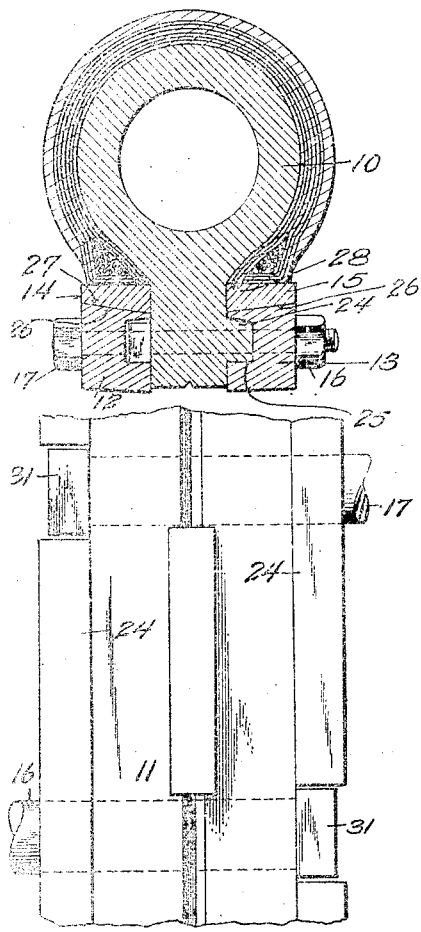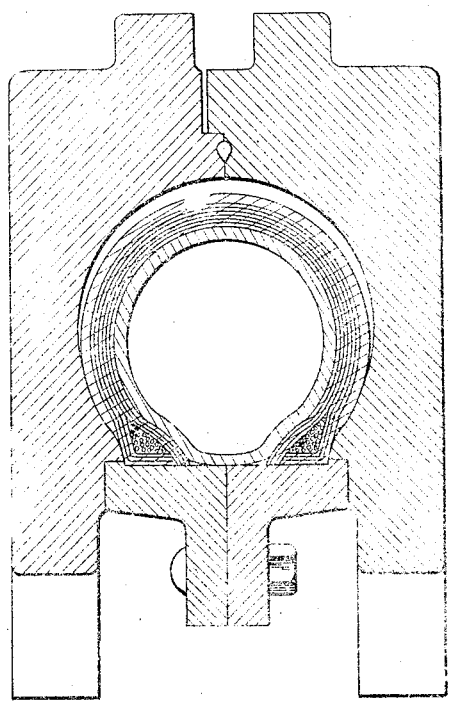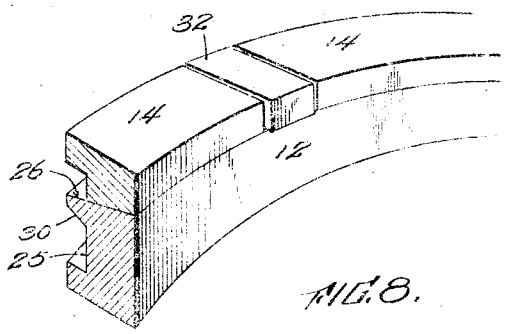

KARL B. KILBORN, OF AKRON, OHIO, ASSIGNOR TO THE GOODYEAR TIRE AND RUBBER COMPANY, OF AKRON, OHIO, A CORPORATION OF OHIO.

METHOD FOR BUILDING TIRES.

1,382,367. Specification of Letters Patent. Patented June 21, 1921.

Original application filed June 13, 1916, Serial No. 101,561. Divided and this application filed June 29, 1918. Serial No. 242,642.

*To all whom it may concern:*

Be it known that I, KARL B. KILBORN, a citizen of the United States, residing at Akron, in the county of Summit and State of Ohio, have invented a new and Improved Method for Building Tires, of which the following is a specification.

The present invention relates to new and improved methods for building automobile and other pneumatic vehicle tires.

This is a division of application, Serial Number 101,561, filed June 13, 1916, issued as Patent No. 1,275,942, such division being in accordance with office action on above mentioned application, dated July 21, 1916.

In accordance with the present practice of building up tire carcasses upon the core, the inner plies of fabric are "stitched" into close conformity to the core and the outer plies have their edge portions lapped around beads generally of the non-extensible type. In the smaller sizes of tires no particular manufacturing difficulties are encountered, but when the larger sizes from seven inch up to twelve inch are built, the relatively greater difference between the inner and outer circumference of the tires results in the presence at the edges of the tire of an excess amount of fabric which must be crowded around the beads. Moreover, in the case of the larger tires, the fabric employed is relatively heavier and stiffer and cannot be lapped smoothly across the base faces of the beads by the tire builder. The fabric at the bead edges then wrinkles and bulks out beyond its proper limits.

When the fabric carcass has been built up upon the core, both are placed in a mold for curing. The type of mold customarily employed is provided with laterally and inwardly projecting rings on its mating sections, these rings being of such size as to engage the "toes" of the tire where the edges of the outer fabric plies have been lapped over the beads. If these lapped fabric edges are loose, wrinkled or bulkier than is expected in the finished product, the mold rings do not smoothly engage the tire toes when the mold sections are brought together, but instead do a permanent damage to the beads and toes of the tire by "chewing" a way through the excess fabric.

Being cognizant of the above conditions, it is therefore one of the principal objects of my present invention to equip the ring core with means whereby mechanical pressure acting outwardly and radially from the axis of the core may be exerted against the edge portions of the plies of fabric which lie against the base face of the beads with the result that the wrinkles in these edge portions of the fabric will be eliminated and the fabric compressed so as to occupy the zone of predetermined dimensions.

A more specific object of my present invention is to provide a ring core which is of the well known sectional type but is so designed that it may be readily equipped with expansible rings adapted to be applied to the neck of the core and expanded, by a pair of complemental wedge rings, to smooth and press the wrinkles out of the fabric at the toe of the tire prior to the application of the mold sections to the carcass for curing.

It is another object of the invention to make these expansible rings capable of individual application to or removal from the ring core so that the worker may continue to follow the present practice of working the beads into the tire one at a time.

The above and additional objects of a similar nature, which will be hereinafter more specifically treated, are preferably accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, reference numbers designate corresponding parts:

Figure 1 is a side elevational view of the ring core of this invention, the sections thereof being assembled for use;

Fig. 2 is a detail elevational view of the expansible ironing ring, *per se;*

Fig. 3 is a similar view of the core ring;

Fig. 4 is a sectional view taken on the plane indicated by the lines 4—4, Fig. 1, showing the method of joining the core sections;

Fig. 5 is a transverse sectional view taken through a mold in which is placed a tire mounted upon the present core;

Fig. 6 is a bottom plan view of a section of the core;

Fig. 7 is a perspective detail of the member employed to close the gap in the ring;

Fig. 8 is a sectionally perspective view of the method of employment of the member shown in Fig. 7;

Fig. 9 is a transverse sectional view through the core as employed in the building up of a cord tire; and Fig. 10 is a transverse sectional view taken through a mold at the beginning of the final vulcanizing process for the cord tire of Fig. 9.

The core of the present invention includes as its essential elements of construction a core body 10 having a neck 11 (see Fig. 1), a pair of wedge rings 12 and 13 (see Fig. 5), a pair of expansible rings 14 and 15 and two sets of bolts 16 and 17 which are applicable to the neck for drawing the wedge rings inwardly to effect the required expansion of the expansible rings and a resultant smoothing and pressing of the fabric at the base faces of the tire beads for removal of the wrinkles in the fabric.

The ring core employed in the present invention is for the most part of a conventional design employed in building up non-extensible bead carcasses comprising as it does five sections 18, 19, 20, 21 and 22, which may be solid as shown or hollow if desired, and are adapted to mate as in Fig. 1 forming a complete annulus. The bodies of these core sections are equipped with neck sections 23 which mate as shown in Fig. 1 to form the annular internal neck for the core.

This neck is, as best shown in Figs. 1, 6, 8 and 9, provided on each side face with a plurality of equidistantly and circumferentially spaced and alined segmental lugs 24. The spaces between lugs on one side on the neck are staggered with respect to the spaces between lugs of the other side of the neck as best disclosed in Fig. 6. This arrangement of the lugs is necessary in order that the heads of the set of bolts 16 (preferably eight in number) which secure the wedge ring 12 in place upon the neck may be disposed so as not to interfere with the application of the other wedge ring 13. It will be apparent that these bolts 16 have their heads received in the spaces between the lugs on one side of the neck and on that side thereof opposed to the ring 12 while the bolts 17 which secure the other wedge ring 13 in place have their heads located in the spaces between the lugs on the opposite side of the neck. Thus the expansible rings 14 and 15 may be separately applied or removed during the manufacture of the tire.

The wedge rings 12 and 13 are provided on their faces with recesses 25 which receive the lugs 24 as in Figs. 8 and 9. The outer faces 26 of these wedge rings are beveled as in Fig. 9 so that they may be engaged with the oppositely beveled inner faces 27 of the rings 14 and 15 in a manner to effect the expansion of these rings when drawn inwardly toward the core neck. The outer face of the rings 14 and 15 extend at right angles to the plane of the ring core and may, therefore, be so expanded as to properly compress the fabric at the base face 28 of the bead and thereby eradicate all wrinkles caused by the crowding of the excess fabric about the bead.

It is preferable that the outer curved faces 29 of the lugs 24 be beveled or sloped oppositely to the inner faces 27 of the expansible rings and that the outer wall 30 of the recess 25 in each wedge ring be beveled to mate with the faces 29 of the lugs. By this construction, the tightening of the nuts 31 of the sets of bolts 16 and 17 will serve both to wedge the rings 12 and 13 more firmly upon the lugs and to expand the rings 14 and 15 all the more forcibly against the tire base flanges. This particular bevel of the faces of the lugs and the engaging walls of the recess 24 is of further advantage in that it positively insures proper placement of the wedge rings against the core neck, relieves the bolts of the lateral strains, and insures uniform expansion of all portions of each ring 14 and 15.

The expansible rings are of the split type and when each has been drawn into proper engagement with the neck by the application of nuts to its set of securing bolts and has been expanded to properly smooth and press the wrinkles in the fabric around the tire base flanges or beads, a small plug 32 of the type shown in Fig. 7 is inserted as in Fig. 8 between their ends the expansible ring. Owing to the expansion of the split rings 14 and 15 under the action of the rings 12 and 13, a circumferential ironing or wiping action is produced around the base face 28 of the bead. This feature is particularly advantageous in smoothing and pressing out the wrinkles in the fabric and is more effective than a direct radial expansion alone.

The present core is not limited in use to bulky and wrinkled bead portions of fabric tires but may be employed to advantage in connection with the manufacture of cord tires. When employed in this connection the cord tire is first laid up upon the core and the expansible rings are employed in a manner previously set forth to eradicate wrinkles and properly dispose the ends of the cords against the bead. The tire is then removed from the core and placed upon a rim as in Fig. 10 which permits the employment of an air bag during the vulcanization of the tire. Owing to their split formation, the movement of the expansible rings is greatest at the ends of the rings and gradually decreases toward that portion of each ring which is diametrically opposite its split portion. This decreasing movement of certain portions of the rings, however, is advantageously offset, by the wiping movement of the base faces of the beads about the rings, as each base face stretches under compression and gradually becomes slightly enlarged in circumference under the expanding action of the rings. Thus, a wiping or ironing effect is produced entirely around the circumference of each bead base portion. It is to be understood, however, that this wiping or ironing action is a matter of degree, that varies in accordance with the number of plies of the tire and the material used, and, therefore, the amount of compressibility inherent in the bead structures.

It should now be noted that the primary advantage offered by my present invention regardless of whether it is employed in the manufacture of cord or fabric tires is that it makes possible the ironing out of the wrinkles in the carcass material, at the zone in which the material is necessarily crowded, prior to the application of the mold sections. A complemental advantage is that the mold sections employed in the curing of the tire built upon my present core need not be provided with the usual internal rings with the result that the liability of damage to the fabric about the beads during the application of the mold sections is eliminated.

While the core ironing rings and wedging rings are herein disclosed and described as being particularly adapted for use in connection with non-extensible straight side beads, it is to be understood that every feature of the invention may be employed with the same efficiency where the beads are of the straight side non-extensible type, the extensible straight side type, non-extensible clencher or extensible clencher type, the effect which the expansion of the ironing rings has upon the fabric at the bead being substantially the same in each instance.

It will be understood that when a clencher tire is built up on a core having ironing rings constructed in accordance with the present invention the outer faces of the tire are properly channeled or curved to correspond with the curvature of the clencher type of bead.

What I claim is:

1. The method of manufacturing tire carcasses which comprises the following steps: (a) building up the fabric body on a ring core and stitching the edge portions of the plies of fabric around the beads; (b) applying a mechanical pressure against the edge portions of the plies in a direction outward and radial with respect to the core axis to iron out and compress the wrinkles present in those portions of the fabric plies which are located about the bead of the tire carcass.

2. The method of manufacturing tire carcasses which comprises the following steps: (a) building up the fabric body on a ring core and stitching the edge portions of the plies of fabric around the beads; (b) applying a mechanical pressure against the edge portions of the fabric in a direction outward and radial with respect to the core axis to iron out and compress the wrinkles present in those portions of the fabric which are located about the bead; (c) removing the fabric carcass, the bead portions of which have been thus ironed, from the ring core and applying it to a rim for curing under internal pressure.

3. The method of manufacturing tire carcasses which comprises the following steps: (a) building up the fabric body on a ring core and stitching the edge portions of the plies of fabric around the beads; (b) applying pressure outwardly and radially with respect to the core axis to compress the fabric around the base face of the bead; and (c) smoothing the base face of the bead in a circumferential direction to iron out and eradicate wrinkles present therein.

4. The method of manufacturing tire carcasses which comprises the following steps: (a) building up the fabric body on a ring core and stitching the edge portions of the plies of fabric around the beads; (b) applying pressure outwardly and radially with respect to the core axis to compress the fabric around those portions of the fabric plies located about the bead of the tire carcass; (c) smoothing the base portion of the bead in a circumferential direction to iron out and eradicate the wrinkles therein and (d) removing the fabric carcass, the bead portions of which have been thus pressed and smoothed from the ring core, and applying it to a rim for curing under internal pressure.

5. The method of manufacturing tire carcasses which comprises the following steps: (a) building up and stitching a carcass and bead portions; and (b) applying pressure outwardly and radially against the base face of the bead portions to stretch said base portions, and simultaneously exerting a wiping action circumferentially of the base face of the bead portions.

6. The method of manufacturing tire carcasses which comprises the following steps:

(a) building up and stitching a carcass and bead portions; and (b) applying to the base of said bead portions pressure that is at once outward, radial and circumferential, whereby the wrinkles are pressed out of said bead portions.

In witness whereof, I have hereunto signed my name in the presence of two subscribing witnesses.

KARL B. KILBORN.

Witnesses:
R. S. TROGNER,
B. J. McDANEL.